(12) United States Patent
Richert (10) Patent No.: US 10,197,664 B2
(45) Date of Patent: Feb. 5, 2019

(54) APPARATUS AND METHODS FOR DETECTION OF OBJECTS USING BROADBAND SIGNALS

(71) Applicant: Brain Corporation, San Diego, CA (US)

(72) Inventor: Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 462 days.

(21) Appl. No.: 14/804,043

(22) Filed: Jul. 20, 2015

(65) Prior Publication Data

US 2017/0023661 A1  Jan. 26, 2017

(51) Int. Cl.
*G01S 7/02* (2006.01)
*G01S 7/486* (2006.01)
(Continued)

(52) U.S. Cl.
CPC ............. *G01S 7/02* (2013.01); *G01S 7/023* (2013.01); *G01S 7/354* (2013.01); *G01S 7/4865* (2013.01); *G01S 7/493* (2013.01); *G01S 7/536* (2013.01); *G01S 13/08* (2013.01); *G01S 13/325* (2013.01); *G01S 13/931* (2013.01); *G01S 15/08* (2013.01); *G01S 15/325* (2013.01);
(Continued)

(58) Field of Classification Search
CPC .......... G01S 17/02; G01S 17/08; G01S 17/32; G01S 17/10; G01S 17/936; G01S 17/003; G01S 17/88; G01S 17/95
See application file for complete search history.

(56) References Cited

U.S. PATENT DOCUMENTS 5,063,603 A    11/1991  Burt
5,138,447 A     8/1992  Shen et al.
(Continued)

FOREIGN PATENT DOCUMENTS

CN    102226740 A    10/2011
JP    H0487423 A     3/1992
(Continued)

OTHER PUBLICATIONS

Berkes, et al., Slow feature analysis yields a rich repertoire of complex cell properties. Journal of Vision (2005) vol. 5 (6).
(Continued)

*Primary Examiner* — Brigitte A Paterson
(74) *Attorney, Agent, or Firm* — Reed Smith LLP; Sidharth Kapoor (57) ABSTRACT

Broadband signal transmissions may be used for object detection and/or ranging. Broadband transmissions may comprise a pseudo-random bit sequence or a bit sequence produced using, a random process. The sequence may be used to modulate transmissions of a given wave type. Various types of waves may be utilized, pressure, light, and radio waves. Waves reflected by objects within the sensing volume may be sampled. The received signal may be convolved with a time-reversed copy of the transmitted random sequence to produce a correlogram. The correlogram may be analyzed to determine range to objects. The analysis may comprise determination of one or more peaks/ troughs in the correlogram. Range to an object may be determines based on a time lag of a respective peak.

21 Claims, 4 Drawing Sheets

(51) Int. Cl.

| | | |
|---|---|---|
| *G01S 13/08* | (2006.01) | |
| *G01S 15/08* | (2006.01) | |
| *G01S 17/08* | (2006.01) | |
| *G01S 15/93* | (2006.01) | |
| *G01S 17/93* | (2006.01) | |
| *G01S 13/93* | (2006.01) | |
| *G01S 17/32* | (2006.01) | |
| *G01S 7/35* | (2006.01) | |
| *G01S 7/493* | (2006.01) | |
| *G01S 7/536* | (2006.01) | |
| *G01S 13/32* | (2006.01) | |
| *G01S 15/32* | (2006.01) | |
| G01S 17/00 | (2006.01) | |
| G01S 13/00 | (2006.01) | |
| G01S 13/02 | (2006.01) | |
| G01S 15/00 | (2006.01) | |
| A01D 34/00 | (2006.01) | |

(52) U.S. Cl.
CPC ............ *G01S 15/931* (2013.01); *G01S 17/08* (2013.01); *G01S 17/32* (2013.01); *G01S 17/936* (2013.01); *A01D 34/008* (2013.01); G01S 13/003 (2013.01); G01S 13/0209 (2013.01); G01S 15/003 (2013.01); G01S 17/003 (2013.01)

(56) References Cited

U.S. PATENT DOCUMENTS

| | | |
|---|---|---|
| 5,216,752 A | 6/1993 | Tam |
| 5,272,535 A | 12/1993 | Elabd |
| 5,355,435 A | 10/1994 | Deyong et al. |
| 5,638,359 A | 6/1997 | Peltola et al. |
| 5,673,367 A | 9/1997 | Buckley |
| 5,875,108 A | 2/1999 | Hoffberg et al. |
| 6,009,418 A | 12/1999 | Cooper |
| 6,014,653 A | 1/2000 | Thaler |
| 6,035,389 A | 3/2000 | Grochowski et al. |
| 6,359,601 B1 | 3/2002 | Maguire, Jr. |
| 6,418,424 B1 | 7/2002 | Hoffberg et al. |
| 6,458,157 B1 | 10/2002 | Suaning |
| 6,501,515 B1 | 12/2002 | Iwamura |
| 6,501,794 B1 | 12/2002 | Wang et al. |
| 6,509,854 B1 | 1/2003 | Morita et al. |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,556,610 B1 | 4/2003 | Jiang et al. |
| 6,581,046 B1 | 6/2003 | Ahissar |
| 6,625,317 B1 | 9/2003 | Gaffin et al. |
| 6,678,590 B1 | 1/2004 | Burchfiel |
| 7,016,783 B2 | 3/2006 | Hac et al. |
| 7,113,867 B1 | 9/2006 | Stein |
| 7,142,602 B2 | 11/2006 | Porikli et al. |
| 7,430,682 B2 | 9/2008 | Carlson et al. |
| 7,447,337 B2 | 11/2008 | Zhang et al. |
| 7,580,907 B1 | 8/2009 | Rhodes |
| 7,653,255 B2 | 1/2010 | Rastogi |
| 7,737,933 B2 | 6/2010 | Yamano et al. |
| 7,809,197 B2 | 10/2010 | Fedorovskaya et al. |
| 7,849,030 B2 | 12/2010 | Ellingsworth |
| 8,000,967 B2 | 8/2011 | Taleb |
| 8,015,130 B2 | 9/2011 | Matsugu et al. |
| 8,103,602 B2 | 1/2012 | Izhikevich |
| 8,108,147 B1 | 1/2012 | Blackburn |
| 8,160,354 B2 | 4/2012 | Paquier |
| 8,200,593 B2 | 6/2012 | Guillen et al. |
| 8,311,965 B2 | 11/2012 | Breitwisch et al. |
| 8,315,305 B2 | 11/2012 | Petre et al. |
| 8,390,707 B2 | 3/2013 | Yamashita |
| 8,396,249 B1 | 3/2013 | Khosla et al. |
| 8,396,282 B1 | 3/2013 | Huber et al. |
| 8,416,847 B2 | 4/2013 | Roman |
| 8,416,992 B2 | 4/2013 | Lemeur |
| 8,467,623 B2 | 6/2013 | Izhikevich et al. |
| 8,542,875 B2 | 9/2013 | Eswara |
| 8,712,939 B2 | 4/2014 | Szatmary et al. |
| 9,070,285 B1 | 6/2015 | Ramu et al. |
| 9,150,220 B2 | 10/2015 | Clarke et al. |
| 9,630,318 B2 | 4/2017 | Rink |
| 9,713,982 B2 | 7/2017 | Buibas et al. |
| 2002/0038294 A1 | 3/2002 | Matsugu |
| 2002/0176025 A1 | 11/2002 | Kim et al. |
| 2003/0050903 A1 | 3/2003 | Liaw et al. |
| 2003/0216919 A1 | 11/2003 | Roushar |
| 2004/0054964 A1 | 3/2004 | Bozdagi et al. |
| 2004/0136439 A1 | 7/2004 | Dewberry et al. |
| 2004/0170330 A1 | 9/2004 | Fogg et al. |
| 2004/0193670 A1 | 9/2004 | Langan et al. |
| 2004/0233987 A1 | 11/2004 | Porikli et al. |
| 2005/0015351 A1 | 1/2005 | Nugent |
| 2005/0036649 A1 | 2/2005 | Yokono et al. |
| 2005/0047647 A1 | 3/2005 | Rutishauser et al. |
| 2005/0062846 A1 | 3/2005 | Choi et al. |
| 2005/0096539 A1 | 5/2005 | Leibig et al. |
| 2005/0283450 A1 | 12/2005 | Matsugu et al. |
| 2006/0008144 A1 | 1/2006 | Prasad et al. |
| 2006/0088191 A1 | 4/2006 | Zhang et al. |
| 2006/0094001 A1 | 5/2006 | Torre et al. |
| 2006/0127042 A1 | 6/2006 | Park et al. |
| 2006/0129728 A1 | 6/2006 | Hampel |
| 2006/0161218 A1 | 7/2006 | Danilov |
| 2006/0188168 A1 | 8/2006 | Sheraizin et al. |
| 2006/0285724 A1 | 12/2006 | Tian |
| 2007/0003130 A1 | 1/2007 | Goerick et al. |
| 2007/0022068 A1 | 1/2007 | Linsker |
| 2007/0071100 A1 | 3/2007 | Shi et al. |
| 2007/0109409 A1 | 5/2007 | Yea et al. |
| 2007/0176643 A1 | 8/2007 | Nugent |
| 2007/0208678 A1 | 9/2007 | Matsugu |
| 2008/0043848 A1 | 2/2008 | Kuhn |
| 2008/0100482 A1 | 5/2008 | Lazar |
| 2008/0152236 A1 | 6/2008 | Vendrig et al. |
| 2008/0174700 A1 | 7/2008 | Takaba |
| 2008/0199072 A1 | 8/2008 | Kondo et al. |
| 2008/0205764 A1 | 8/2008 | Iwai et al. |
| 2008/0237446 A1 | 10/2008 | Oshikubo et al. |
| 2008/0252723 A1 | 10/2008 | Park |
| 2008/0267458 A1 | 10/2008 | Laganiere et al. |
| 2009/0018696 A1 | 1/2009 | Goerick et al. |
| 2009/0028384 A1 | 1/2009 | Bovyrin et al. |
| 2009/0043722 A1 | 2/2009 | Nugent |
| 2009/0096863 A1 | 4/2009 | Kim et al. |
| 2009/0096927 A1 | 4/2009 | Camp, Jr. et al. |
| 2009/0106030 A1 | 4/2009 | Den et al. |
| 2009/0141938 A1 | 6/2009 | Lim et al. |
| 2009/0195640 A1 | 8/2009 | Kim et al. |
| 2009/0202114 A1 | 8/2009 | Morin et al. |
| 2009/0287624 A1 | 11/2009 | Rouat et al. |
| 2009/0304231 A1 | 12/2009 | Lu et al. |
| 2009/0312985 A1 | 12/2009 | Eliazar |
| 2009/0323809 A1 | 12/2009 | Raveendran |
| 2010/0036457 A1 | 2/2010 | Sarpeshkar et al. |
| 2010/0073371 A1 | 3/2010 | Ernst et al. |
| 2010/0080297 A1 | 4/2010 | Wang et al. |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar et al. |
| 2010/0235310 A1 | 9/2010 | Gage et al. |
| 2010/0271511 A1 | 10/2010 | Ma et al. |
| 2010/0290530 A1 | 11/2010 | Huang et al. |
| 2010/0299296 A1 | 11/2010 | Modha et al. |
| 2011/0002191 A1 | 1/2011 | Demaio et al. |
| 2011/0016071 A1 | 1/2011 | Guillen et al. |
| 2011/0063409 A1 | 3/2011 | Hannuksela |
| 2011/0103480 A1 | 5/2011 | Dane |
| 2011/0119214 A1 | 5/2011 | Breitwisch et al. |
| 2011/0119215 A1 | 5/2011 | Elmegreen et al. |
| 2011/0134242 A1 | 6/2011 | Loubser et al. |

(56) References Cited

U.S. PATENT DOCUMENTS

| | | |
|---|---|---|
| 2011/0137843 A1 | 6/2011 | Poon et al. |
| 2011/0160741 A1 | 6/2011 | Asano et al. |
| 2011/0170792 A1 | 7/2011 | Tourapis et al. |
| 2011/0206122 A1 | 8/2011 | Lu et al. |
| 2011/0222603 A1 | 9/2011 | Le et al. |
| 2011/0228092 A1 | 9/2011 | Park |
| 2011/0242341 A1 | 10/2011 | Agrawal et al. |
| 2011/0280300 A1 | 11/2011 | Tourapis et al. |
| 2012/0011090 A1 | 1/2012 | Tang et al. |
| 2012/0026304 A1 | 2/2012 | Kawahara |
| 2012/0057634 A1 | 3/2012 | Shi et al. |
| 2012/0072189 A1 | 3/2012 | Bullen et al. |
| 2012/0083982 A1 | 4/2012 | Bonefas et al. |
| 2012/0084240 A1 | 4/2012 | Esser et al. |
| 2012/0093402 A1 | 4/2012 | Staelin et al. |
| 2012/0109866 A1 | 5/2012 | Modha |
| 2012/0130566 A1 | 5/2012 | Anderson et al. |
| 2012/0140032 A1 | 6/2012 | Tabor |
| 2012/0162450 A1 | 6/2012 | Park et al. |
| 2012/0212579 A1 | 8/2012 | Froejdh et al. |
| 2012/0230580 A1 | 9/2012 | Knee |
| 2012/0236114 A1 | 9/2012 | Chang et al. |
| 2012/0243733 A1 | 9/2012 | Sawai |
| 2012/0256941 A1 | 10/2012 | Ballestad et al. |
| 2012/0294486 A1 | 11/2012 | Diggins et al. |
| 2012/0294546 A1 | 11/2012 | Sakamoto et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330447 A1 | 12/2012 | Gerlach et al. |
| 2013/0019024 A1 | 1/2013 | Sheth et al. |
| 2013/0022111 A1 | 1/2013 | Chen et al. |
| 2013/0050574 A1 | 2/2013 | Lu et al. |
| 2013/0051680 A1 | 2/2013 | Kono et al. |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0147915 A1 | 6/2013 | Wiegand et al. |
| 2013/0148882 A1 | 6/2013 | Lee |
| 2013/0151450 A1 | 6/2013 | Ponulak |
| 2013/0176430 A1 | 7/2013 | Zhu et al. |
| 2013/0218821 A1 | 8/2013 | Szatmary et al. |
| 2013/0222534 A1 | 8/2013 | Rusanovskyy et al. |
| 2013/0226532 A1 | 8/2013 | Ben et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325777 A1 | 12/2013 | Petre et al. |
| 2013/0343610 A1 | 12/2013 | Dal et al. |
| 2014/0003711 A1 | 1/2014 | Ngan et al. |
| 2014/0012788 A1 | 1/2014 | Piekniewski |
| 2014/0016858 A1 | 1/2014 | Richert |
| 2014/0028793 A1 | 1/2014 | Wiegand et al. |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0085507 A1 | 3/2014 | Pillman et al. |
| 2014/0086486 A1 | 3/2014 | Pillman et al. |
| 2014/0119654 A1 | 5/2014 | Taylor et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0124004 A1 | 5/2014 | Rosenstein et al. |
| 2014/0156574 A1 | 6/2014 | Piekniewski et al. |
| 2014/0201126 A1 | 7/2014 | Zadeh et al. |
| 2014/0241612 A1 | 8/2014 | Rhemann et al. |
| 2014/0328405 A1 | 11/2014 | Shen et al. |
| 2014/0379179 A1 | 12/2014 | Goossen et al. |
| 2015/0077639 A1 | 3/2015 | Chamaret et al. |
| 2015/0127154 A1 | 5/2015 | Passot et al. |
| 2015/0127155 A1 | 5/2015 | Passot et al. |
| 2015/0181168 A1 | 6/2015 | Pahalawatta et al. |
| 2015/0217449 A1 | 8/2015 | Meier et al. |
| 2015/0269439 A1 | 9/2015 | Versace et al. |
| 2015/0281715 A1 | 10/2015 | Lawrence et al. |
| 2015/0304634 A1 | 10/2015 | Karvounis |
| 2015/0304640 A1 | 10/2015 | Brooks |
| 2015/0312547 A1 | 10/2015 | Cucca |
| 2016/0003946 A1* | 1/2016 | Gilliland .............. G01S 17/10 356/5.01 |
| 2016/0007043 A1 | 1/2016 | Heo et al. |
| 2016/0009413 A1 | 1/2016 | Lee et al. |
| 2016/0165209 A1 | 6/2016 | Huang et al. |
| 2016/0182884 A1 | 6/2016 | Lin et al. |
| 2016/0313445 A1* | 10/2016 | Bailey .................. G01S 7/481 |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Florian (2003), Biologically Inspired Neural Networks for the Control of Embodied Agents, Technical Report Coneural-03-03 Version 1.0 [online], Nov. 30, 2003 [retrieved on Nov. 24, 2014].

(56) References Cited

OTHER PUBLICATIONS

Retrieved from the Internet: <url:http: download?doi="10.1.1.216.4931-"&rep1&type="pdf"></url:http:>.

Foldiak, P. Learning invariance from transformation sequences. Neural Computation, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. I-15. 2(4): 1430, doi: 1 0.4249/scholarpedia. 1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.coinlurl ?sa-t&rct-j&q-Giuck+ 4)/022STIMULUS+GENERALIZATION+AND+REPRESENTATIO N+1N +ADAPTIVE+NETWORK+MODELS±0F+CATEGORY+LEARN ING%22+ 1991.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Hopfield JJ (1995) Pattern recognition computation using action potential timing for stimulus representation.Nature 376: 33-36.

Izhikevich E.M. (2004) Which Model to Use for Cortical Spiking Neurons? IEEE Transactions on Neural Networks, 15:1063-1070.

Izhikevich E.M. (2006) Polychronization: Computation With Spikes. Neural Computation, 18:245-282.

Izhikevich, E,M. (2007) Dynamical Systems in Neuroscience: The Geometry of Excitability and Bursting, the MIT Press, 2007.

Izhikevich, E.M, et al. (2009), Polychronous Wavefront Computations. International Journal of Bifurcation and Chaos, 19:1733-1739.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Janowitz, M.K., et al., Excitability changes that complement Hebbian learning. Network, Computation in Neural Systems, 2006, 17 (1), 31-41.

Karbowski et al., 'Multispikes and Synchronization in a Large Neural Network with Temporal Delays', Neural Computation 12. 1573-1606 (2000).

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.

Knoblauch, et al., Memory Capacities for Synaptic and Structural Plasticity, Neural Computation 2009, pp. 1-45.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et a[. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Masquelier, et al., Learning to recognize objects using waves of spikes and Spike Timing-Dependent Plasticity. Neural Networks (IJCNN), The 2010 International Joint Conference on DOI—10. 1109/1JCNN.2010.5596934 (2010) pp. 1-8.

Masquelier, Timothee, 'Relative spike time coding and STOP-based orientation selectivity in the early visual system in natural continuous and saccadic vision: a computational model.' Journal of computational neuroscience 32.3 (2012): 425-441.

Meister, M.; Berry, M.J. The neural code of the retina, Neuron, 1999, 22, 435-450.

Meister, M, Multineuronal codes in retinal signaling. Proceedings of the National Academy of sciences. 1996, 93, 609-614.

Nichols, A Reconfigurable Computing Architecture for Implementing Artificial Neural Networks on FPGA, Master's Thesis, The University of Guelph, 2003, pp. 1-235.

Oster, M., et al., A Spike-Based Saccadic Recognition System, ISCAS 2007. IEEE International Symposium on Circuits and Systems, 2009, pp. 3083-3086.

Paugam-Moisy et al, "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu! viewdoc/download?doi=0.1.1.5.4346&rep-repl&type-pdf.

Rekeczky, et al., "Cellular Multiadaptive Analogic Architecture: A Computational Framework for UAV Applications." May 2004.

Revow, M., et al., 1996, Using Generative Models for Handwritten Digit Recognition, IEEE Trans. on Pattern Analysis and Machine Intelligence, 18, No. 6, Jun. 1996.

Sanchez, Efficient Simulation Scheme for Spiking Neural Networks. Doctoral Thesis. (Juiversita di Granada Mar. 28, 2008, pp. 1-104.

Sato et al., 'Pulse interval and width modulation for video transmission.' Cable Television, IEEE Transactions on 4 (1978): 165-173.

Schemmel, J., et al., Implementing synaptic plasticity in a VLSI spiking neural network model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <url:> Introduction</url:>.

Schnitzer, M.J., et al., Multineuronal Firing Patterns in the Signal from Eye to Brain. Neuron, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from <:URL:http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al,, "Spike-timing Theory of Working Memory" PLoS Computational Biology, vol. 6, Issue 8, Aug. 19, 2010 [retrieved on (56) References Cited

OTHER PUBLICATIONS

Dec. 30, 2013]. Retrieved from the Internet: URL: http://www.ploscompbioLorg/article/info%3Adoi%2F10.1371%2Fjournal,pcbi.1000879<url:></url:>.

Thomas, S., et al, (2004), Realistic Modeling of Simple and Complex Cell Tuning in the HMAX Model, and Implications for Invariant Object Recognition in Cortex, Al Memo 2004-017 Jul. 2004.

Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

Thorpe, S.J., et al. (2001), Spike-based strategies for rapid processing. Neural Networks 14, pp. 715-725.

Thorpe, S.J., et al. (2004), SpikeNet: real-time visual processing with one spike per neuron, Neurocomputing, 58-60, pp. 857-864.

Van Rullen, et al. (2003), Is perception discrete or continuous? Trends in Cognitive Sciences 7(5), pp. 207-213.

Van Rullen, R., et al (2005), Spike times make sense. Trends in Neurosciences 28(1).

Van Rullen R., et al., Rate Coding versus temporal order coding: What the Retinal ganglion cells tell the visual cortex. Neural computation, 2001, 13, 1255-1283.

Wallis, G., et al., A model of invariant object recognition in the visual system, Progress in Neurobiology. 1997, 51, 167-194.

Wang 'The time dimension for scene analysis.' Neural Networks, IEEE Transactions on 16.6 (2005): 1401-1426.

Wiskott, L., et al., Slow feature analysis: Unsupervised learning of invariances, Neural Computation, 2002, 14, (4), 715-770.

Wysoski et al, "Fast and Adaptive Network of Spiking Neuron for Multi-view Visual Pattern Recognition", May 3, 2008, Elsevier,Neurocomputing vol. 71, pp. 2563-2575.

Zarandy, et al., "Bi-i: A Standalone Ultra High Speed Cellular Vision System." In: [online]. Dated Jun. 13, 2005 (Jun. 13, 2005). Retrieved on Jun. 13, 2005 (Jun. 13, 2005). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738<http:login.jsp?tp="&amumber=1438738&url=http%3A%2F%2Fiee"></http:>.

\* cited by examiner

APPARATUS AND METHODS FOR DETECTION OF OBJECTS USING BROADBAND SIGNALS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to remote detection of objects and more particularly in one exemplary aspect to computer apparatus and methods for detecting objects using reverse correlation ranging.

Description of Related Art

Object detection may be of use in a variety of applications including assisted vehicle navigation, autonomous robotic navigation, home automation, classification, and/or other applications. In some applications of robotic navigation it may be of benefit to detect objects remotely with a given margin of time in order to, e.g., execute a maneuver.

Some existing ranging technologies may be susceptible to interfere with one another. For example, two traditional sonars operating at the same time at in the same frequency band may not function correctly due to cross interference.

Additional deficiencies are that existing ranging technologies are often pulsed, as in not operated continuously in time, and as such detection of obstacles between pulses is not possible. For example, a sonar generates a chirp and then waits for the echo, depending on the strength of the chirp the amount of time between chirps can be 100 milliseconds (ms) or longer.

Further, existing technologies normally are narrow band, and as such some objects are not detectable at a specific frequency but would be detected using broad band transmissions.

Accordingly, there is a salient need for improved sensing apparatus and methods for detection of objects and/or ranges to objects.

SUMMARY OF THE DISCLOSURE

The present disclosure satisfies the foregoing needs by providing, inter alia, apparatus and methods for detecting objects using reverse correlation ranging.

In a first aspect of the present disclosure, an apparatus for determining range to an object is disclosed. In one embodiment, the apparatus includes: a transmitter component configured to transmit a broadband signal; a receiver component configured to sample a reflected signal comprised of a reflection of the broadband signal off the object, to produce a sampled signal; and a processing component. In one exemplary embodiment, the processing component is further configured to: determine a time-reversed instance of the transmitted signal; determine a correlogram, the correlogram comprising a convolution of the time reversed instance of the transmitted signal and the sampled signal at a plurality of lags; compare one or more correlogram values at the plurality of lags to a detection threshold; and based on a given correlogram value breaching the detection threshold, determine a range to the object corresponding to a given lag of the plurality of lags associated with the given correlogram value.

In a first variant, the broadband signal comprises a sequence of bits obtained based on a random or pseudo-random process, the sequence of bits characterized by a frequency invariant power spectral density.

In a second variant, the broadband signal comprises a sequence of bits obtained based on a process characterized by a power spectral density that increases with frequency.

In a third variant, the broadband signal comprises a sequence of bits obtained based on a process characterized by a power spectral density that decreases with frequency.

In a fourth variant, the broadband signal comprises a continuously valued sequence characterized by a random or pseudo-random distribution of values. In one such case, the random distribution comprises a Gaussian process.

In a fifth variant, the broadband signal comprises an electromagnetic wave transmission. In one such implementation, the broadband signal further comprises an acoustic wave transmission. In another such implementation, the receiver component is spatially spaced from the transmitter component. In still a third such implementations, the electromagnetic wave is characterized by a frequency selected within a radio frequency band. For example, the transmitter component may comprise an acoustic transducer configured to radiate acoustic waves and a radio frequency antenna configured to radiate radio frequency waves in the radio frequency band. Still further, the receiver component may comprise an acoustic transducer configured to receive reflected acoustic waves and a radio frequency antenna configured to receive reflected radio frequency waves in the radio frequency band. In a fourth such implementation, the electromagnetic wave is characterized by a frequency selected within a visible light frequency band; the transmitter component comprises a light emitting element; and the receiver component comprises a photodetector. In one such case, the light element comprises an electrically pumped semiconductor laser element.

In a sixth variant, the plurality of lags exceeds 100 lags.

In a seventh variant, the detection threshold determination comprises determination of a mean value and a standard deviation value of the correlogram; and the detection threshold comprises a positive component configured greater than the mean value and a negative component configured smaller than a negative mean value having an absolute magnitude equal to the mean value. In one such variant, the positive component is configured based on a first number of standard deviation values above the mean value; and the negative component is configured based on a second number of standard deviation values below the negative mean value.

In a second aspect of the present disclosure, a non-transitory computer-readable storage medium having instructions embodied thereon is disclosed. In one embodiment, the instructions are executable by a processing apparatus to perform a method of detecting an object during navigation by a robotic apparatus, the method comprising: determining a pseudorandom sequence of bits; transmitting the pseudorandom sequence of bits using a wave type to produce a broadband signal, the broadband signal configured to irradiate a portion of an environment of the robotic apparatus; sampling reflections of the broadband signal from one or more objects in the environment; storing the sampled reflections of the broadband signal in a memory buffer for a time interval; convolving the stored sampled reflections with a time-reversed copy of the pseudorandom sequence of bits to produce a correlogram; determining at least one peak value based on an evaluation of the correlogram; and providing an indication of the one or more objects present within the environment to a controller of the robotic apparatus, the indication configured to cause an execution of action by the robotic apparatus.

In a first variant, the pseudorandom sequence of bits comprises a maximum length sequence comprising a number of bits; and the memory buffer is configured to store at least number of samples of the sampled reflections equal to the number of bits.

In a third aspect of the present disclosure, an apparatus for determining at least one positional attribute associated with an object is disclosed. In one embodiment, the apparatus includes: a transmitter component configured to transmit an oscillatory signal; a receiver component configured to sample a reflected signal comprised of a reflection of the oscillatory signal off the object, to produce a sampled signal; and computerized logic. In one embodiment, the computerized logic is configured to: obtain a modified instance of at least a portion of the transmitted oscillatory signal; perform a comparison of at least a portion of the modified instance to at least a portion of the sampled signal; evaluate one or more values obtained from the comparison to a detection criterion; and based on at least one of the one or more values meeting the detection criterion, determine the positional attribute associated with the object corresponding to a parameter associated with the at least one value.

In one variant, said positional attribute comprises a range; said oscillatory signal comprises either a broadband acoustic or broadband electromagnetic signal; said modified instance comprises a time-reversed instance of at least a portion of the transmitted oscillatory instance; said comparison comprises an autocorrelation performed at least at a plurality of time lags of each of the at least portion of modified instance and the at least portion of the sampled signal; said one or more values comprise respective one or more amplitudes; and said evaluation of said one or more values obtained from the comparison to a detection criterion comprises comparison to a predetermined detection threshold value stored in the apparatus.

In a second variant, the oscillatory signal further comprises a pseudorandom sequence that includes a plurality of bits of a given length selected using a random process; and a memory buffer is configured to store at least a number of samples of the sampled reflections greater than the given length.

Further features of the present disclosure, its nature and various advantages will be more apparent from the accompanying drawings and the following detailed description.

All Figures disclosed herein are © Copyright 2015 Brain Corporation. All rights reserved.

DETAILED DESCRIPTION

Embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present disclosure will be described, and detailed descriptions of other portions of such known components will be omitted so as not to obscure the disclosure.

In the present specification, an embodiment showing a singular component should not be considered limiting; rather, the disclosure is intended to encompass other embodiments including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "Wi-Fi" refers to, without limitation, any of the variants of IEEE-Std. 802.11 or related standards including 802.11 a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID/NFC, satellite systems, millimeter wave or microwave systems, acoustic, and infrared (i.e., IrDA).

DETAILED DESCRIPTION OF EXEMPLARY EMBODIMENTS

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein.

Further, the present disclosure encompasses present and future known equivalents to the components referred to herein by way of illustration.

Robotic devices may be used for performing maintenance of residential and/or commercial premises (e.g., retail stores, warehouses, meeting halls, stadiums) and/or other applications. By way of an illustration, an autonomous robotic cleaning apparatus may be employed for cleaning floors in a retail store. Environment in the store premises may be modified on a daily/weekly basis, e.g., during restocking operations and/or by placement of promotional items for a given period of time at a given location. The presence of humans (e.g., customers and/or store personnel) may alter the environment.

During autonomous operations, robots may detect obstacles. The autonomous robotic device may comprise an object detection sensor apparatus configured to detect presence of objects in the environment. The sensor apparatus may comprise a transmitter component and a receiver component spaced from the transmitter component. Such configuration wherein the transmitter and the receiver sensor are not-collocated (e.g., displaced from one another) may be referred to as the bistatic sensor configuration.

The transmitter component may be configured to transmit a signal comprising a random sequence. The receiver component may be used to detect reflection of this random sequence. In some implementations, an existing computer sound card may be employed for audio transmissions, a high speed FPGA may be used for radio and/or light wave transmissions. The transmitted and received signals may be used to determine a correlation of the generated sequence and the received signal (which may contain a reflection/echo). Determining the correlation at different time lags, may enable determination of time delay between transmission and reflections form objects. Time delay may be used to determine distance away to object(s). In some implementations continuous transmission of random signal ("noise") may be used. Detection of objects may be only limited by signal to noise and thus by duration of time needed to average in order to reliably detect objects. In high signal to noise scenarios with high transmission frequencies (e.g., 100 KHz and above), objects may be readily detected in 1 ms time interval or less (100 samples or more).

Figure 1:
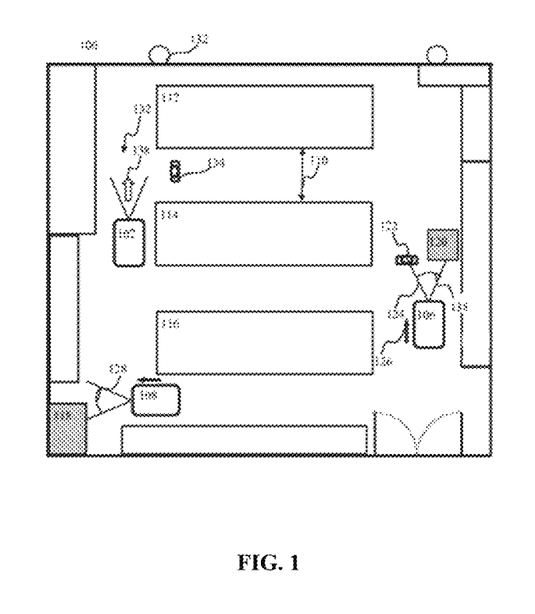
FIG. 1 is block diagram illustrating operation of a robotic apparatus of the disclosure on premises of a retail store in accordance with one implementation.

FIG. 1 illustrates operation of a robotic apparatus comprising a sensing apparatus of the disclosure in an environment comprising objects and/or humans in accordance with one implementation. The layout 100 of FIG. 1 may correspond to a floor plan or a retail store, layout of a shopping mall, an exhibit hall and/or other premises. In some implementations, rectangles 112, 114, 116, 118 may denote one or more of a shelf, a rack, a cabinet, a pallet, a display, a stack, a bin, a container, a box, a pail, and/or other implements for displaying product in a store. One or more shelves (e.g., 112, 114) may be spaced by one or more isles (e.g., isle width denoted by arrow 110 in FIG. 1). The premises layout 100 may comprise one or more humans denoted by icons 134, 122 and corresponding to e.g., store personnel, vendors, shoppers, and/or other categories.

One or more autonomous robotic devices 102, 106, 108 may be operable within the premises 100. The autonomously operating robotic device may be used for a variety of tasks, e.g., floor cleaning (e.g., vacuuming, dusting, scrubbing, polishing, waxing, and/or other cleaning operation), survey (e.g., product count), and/or other operations. Dimensions of the robotic device (e.g., 102) may, for example, be configured in accordance with operational environment of the device (e.g., minimum isle width, available cleaning time, and/or other task parameter).

In some implementations, an autonomously operating robotic device (e.g., 106) may be used for assisting customers (e.g., 122) by e.g., identifying a customer in need of assistance and offering the customer assistance via a machine-human interface. In one or more implementations, the human-machine interface may be based on sound, light, display, gesture, and/or other interface component. Customer detection may comprise analysis of customer posture, movement, gestures, facial expression, speech, sounds, and/or other behavior characteristics provided via camera and/or audio sensor.

One or more autonomously operating robotic devices (e.g., 102, 106, 108) may be configured to navigate the premises 100 along a trajectory. In some implementations, the trajectory may comprise a pre-configured trajectory (e.g., pre-programmed, pre-trained) and/or adaptively learned trajectory. In some implementations, the trajectory configuration may be effectuated using a methodology of combining programming and training e.g., such as described in U.S. patent application Ser. No. 14/613,237, entitled "APPARATUS AND METHODS FOR PROGRAMMING AND TRAINING OF ROBOTIC DEVICES", filed Feb. 3, 2015, each of the foregoing being incorporated herein by reference in its entirety.

In some implementations, training of the trajectory may be accomplished using a plurality of training trials. An individual trial may comprise an instance of the trajectory navigation. Training may be effectuated using supervised learning methodology, e.g., such as described in U.S. patent application Ser. No. 14/070,239 entitled "REDUCED DEGREE OF FREEDOM ROBOTIC CONTROLLER APPARATUS AND METHODS", filed Nov. 1, 2013, Ser. No. 14/070,269, entitled "APPARATUS AND METHODS FOR OPERATING ROBOTIC DEVICES USING SELECTIVE STATE SPACE TRAINING", filed Nov. 1, 2013, and/or Ser. No. 14/542,391 entitled "FEATURE DETECTION APPARATUS AND METHODS FOR TRAINING OF ROBOTIC NAVIGATION" filed Nov. 14, 2014, each of the foregoing being incorporated herein by reference in its entirety.

During training, the premises environment (e.g., illustrated by the layout 100 in FIG. 1) may comprise a given number of objects (e.g., shelves, product displays, furniture, building elements (e.g., partitions, walls, doorways, doors, pillars e.g., 132 in FIG. 1, and/or other elements) infrastructure components (point of sale) and/or other components. During training, the robotic apparatus may be configured to explore the premises environment in order to, e.g., to produce a map or other informational element of or relating to the premises (e.g., such as shown in FIG. 1). The map of the environment may be stored in the non-transitory memory of the robot.

During operation, the layout map (e.g., obtained during training) may be accessed and utilized for navigating the premises. In some implementations, e.g., of nighttime cleanup operations, the layout map may provide an adequate amount of detail for successful navigation of the premises. In one or more implementations, the navigation success may be characterized by one or more of an absence of collisions with objects within the premises, area coverage, energy use, traverse time, and/or other performance characteristics associated with a given task.

In some implementations, e.g., daytime operations and/or nighttime cleanup during restocking), the layout map may become out of date as additional objects (e.g., a product display 118) may be added, displaced (e.g., product display 120) and/or some objects missing (removed). One or more humans (134) may be present on the premises. The robotic device may be configured for dynamic autonomous detection of objects within the elements. As used herein the term object may be used to describe a shelf, a doorway, a pillar, a wall, a human, a display, and/or another physical entity that may protrude above a surface (e.g., floor) being navigated by the robotic device and that may potentially interfere with the task being executed by the robotic device. In some embodiments, the robotic device may additionally differentiate between objects that are stationary (e.g., structural elements of the building, storage boxes, etc.) and objects that frequently move (e.g., humans, animals, shipping boxes, and/or other objects). In some cases, the differentiation may be performed based on e.g., visual analysis (e.g., facial recognition, bar code reader), historic recognition (e.g., the object has not moved for a period of time), and/or other approaches. Various other schemes will be appreciated by those of ordinary skill in the related art, given the contents of the present disclosure.

In some implementations, object detection by the robotic device may be effectuated using a broadband sensor apparatus, e.g., such as described below with respect to FIGS. 2-2B, 5. The sensor apparatus may illuminate and/or irradiate a sensing volume proximate the robotic device using one or more wave types. In one or more implementations, the wave type may comprise a mechanical wave type (e.g., acoustic waves) wherein signal propagation acts as the propagation of a disturbance through a material medium (e.g., air, water) due to the repeated periodic motion of the particles of the medium about their mean positions, the disturbance being handed over from one particle to the next, and/or an electromagnetic wave wherein signal is propagated due to varying electric and/or magnetic fields.

Various mechanical waves may employed, e.g., audible, ultrasonic, infrasonic. Examples of electromagnetic waves may comprise light waves (visible, IR, UV), radio waves, and/or other wave bands. In FIG. 1, the sensing volume is denoted by lines 124 and comprises a volume in front of the robotic device 106 that may be moving along direction indicated by the solid arrow 126. The sensing volume may be characterized by a horizontal extent (e.g., denoted by arc 138, 128 in FIG. 1) and/or vertical extent (e.g. denoted by arc 218 in FIG. 2).

The broadband sensor apparatus may project a given pattern into the sensing volume. In one or more implementations, the pattern may comprise a pseudo-random bit sequence (e.g., maximum length sequence (MLS), Barker code sequence) determined using a maximal linear feedback shift register. In some implementations, the pattern may comprise a random bit sequence produced using, e.g., a random process. Various random processes may be utilized, e.g., uniform, Poisson and/or other process. In some implementations, the pattern may comprise a plurality of bits of a given length (e.g., 1024-bit MLS). Bit values within the sequence may comprise a binary sequence (e.g., [0, 1], [−1 1] or another sequence characterized by two alternate states. In one or more implementations, the sequence magnitude values may be produced using a Gaussian distribution.

Reflected wave signals may be sampled by the sensor. An object being present within the sensing volume (e.g., human 122, product display 120, 118) may alter the sensed (reflected) pattern. Analysis of the sensed pattern may enable detection in real time of one or more objects being present in pathway of the robotic device thereby enabling autonomous operation of the robotic device in presence of potential obstructions.

Figure 2:
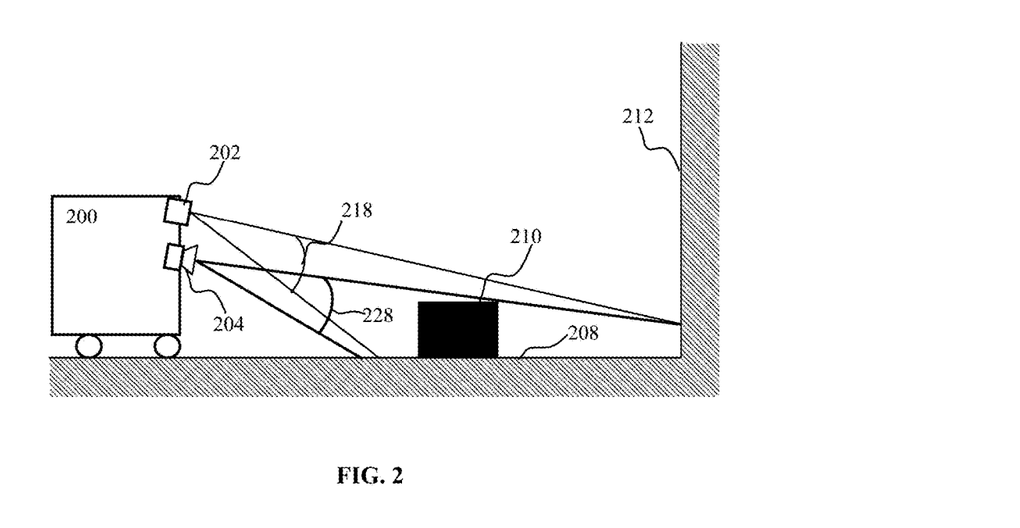
FIG. 2 is a graphical illustration depicting a robotic vehicle comprising sensor apparatus of the disclosure, in accordance with one or more implementations.

FIG. 2 illustrates operation of a robotic vehicle comprising a broadband sensor apparatus, in accordance with one or more implementations. The robotic vehicle 200 may comprise one of the autonomous robotic devices 102, 106, 108 described above with respect to FIG. 1. The autonomously operating robotic device 200 of FIG. 2 may be used for a variety of tasks, e.g., floor cleaning (e.g., vacuuming, dusting, scrubbing, polishing, waxing, and/or other cleaning operation), survey (e.g., product count), and/or other operations. In some implementations, the autonomously operating robotic device may be used for assisting customers by e.g., identifying a customer in need of assistance and offering the customer assistance via a machine-human interface. In one or more implementations, the human-machine interface may be based on sound, light, display, gesture, and/or other interface component. Customer detection may comprise analysis of customer posture, movement, gestures, facial expression, speech, sounds, and/or other behavior characteristics provided via camera and/or audio sensor.

Dimensions of the robotic device may be selected sufficient to support the sensor components 202, 204, e.g., greater than 0.1 m in height in some implementations. The robotic device may be configured to traverse the environment at a speed selected from the range between 0.05 m/s and 10 m/s. In some implementations, the device 200 may comprise a robotic floor cleaning device with the following dimensions: width of 0.8 m, length of 1.6 m and height of 1.14 m. The floor cleaning device may be configured to move during operation at a speed between 0.01 m/s and 3 m/s. The robotic device with above dimensions may be configured to operate within a premises characterized by isle dimensions (e.g., 110) between 1.2 m and 2.7 m.

Figure 3:
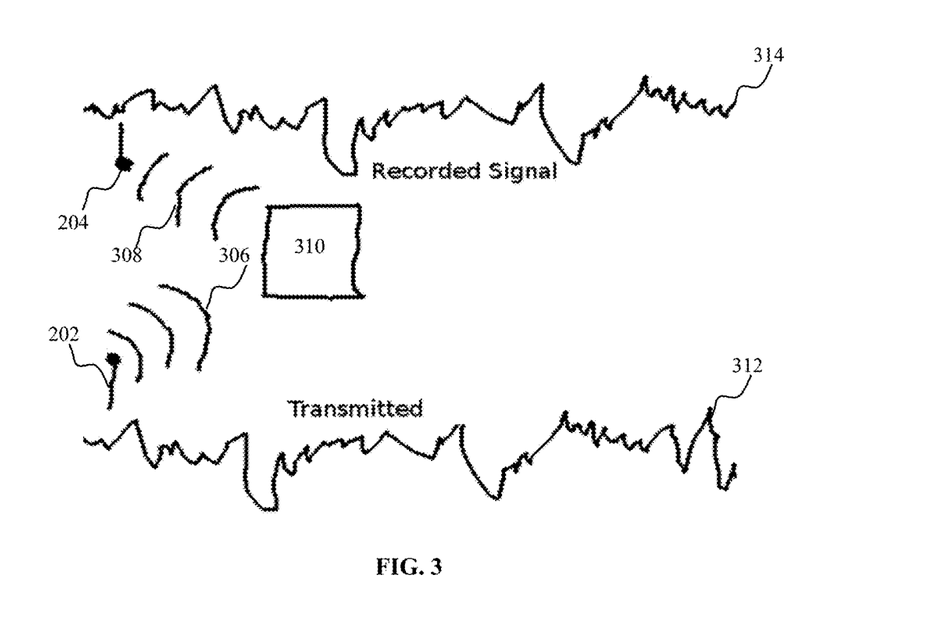
FIG. 3 illustrates signal transmission and recording for use with the reverse correlation ranging methodology of the disclosure in accordance with one implementation.

The device 200 may comprise a broadband sensor apparatus configured to detect presence of objects and/or to determine range to objects in the environment. The sensor apparatus may comprise a transmitter component 202 and a receiver component 204. The transmitter and the receiver components may be disposed spaced from one from one another in a bistatic configuration. In one or more implementations, the transmitter may comprise a light source (e.g., visible, infrared (IR), ultraviolet (UV)), pressure wave (e.g., audio, ultrasonic) source, a radio wave source, and/or other wave type source. In some implementations of light waves, the transmitter 202 may comprise a light emitting diode (LED), electrically pumped semiconductor laser (e.g., a laser diode), and/or another source type; the receiver may comprise a photodetector (e.g., photodiode, and/or a phototransistors), and/or other sensors. In one or more implementations of radio wave transmissions and/or reception, the component 202 may comprise a radio frequency antenna and a radio frequency transmitter; the component 204 may comprise a radio frequency antenna and a radio frequency receiver. The receiver component 204 of the sensor apparatus may comprise an acoustic transducer (e.g., a microphone), and/or other sensor configured to detect reflected waves corresponding to the modality of the transmitter 202.

Transmitter and/or receiver may be characterized by a directivity pattern (e.g., field of view denoted by arcs 218, 228 in FIG. 2 and/or 124 in FIG. 1). In some implementations of radio wave transmissions, radio frequency antennas may comprise dipole antennas characterized by directivity of a dipole. Antennas with an increased directivity (e.g., 3 dB beam width of less than) 180° directional In some implementations of light transmissions, center axis of the transmitter 202 field of view 218 may be inclined with respect to the plane of operation of the apparatus 200 (e.g., the plane 212 in FIG. 2).

The transmitter component 202 may project (e.g., as illustrated by curves 306 in FIG. 3) a given pattern into sensing volume. In one or more implementations, the pattern may comprise a pseudo-random bit sequence (e.g., maximum length sequence) determined using a maximal linear feedback shift register. Various random processes may be utilized, e.g., uniform, Gaussian, Poisson and/or other process. In some implementations, the pattern may comprise a plurality of bits of a given length (e.g., 1024-bit MLS). Bit values within the sequence may comprise a binary sequence (e.g., [0, 1], [−1 1] or another sequence characterized by two alternate states. In some implementations, the pattern may comprise a binary (bit) sequence produced using, a given process. In some implementations, the process used to determine the bit sequence may comprise a random distribution wherein the bit sequence may be referred to as "white noise", i.e., a random signal with a constant (or near constant) in frequency (or frequency invariant) power spectral density and/or a discrete signal whose samples are regarded as a sequence of serially uncorrelated random variables with zero mean and finite variance. Biased distributions, (e.g., a pink noise process wherein the power spectral density (energy or power per Hz) is inversely proportional to the frequency of the signal, a "blue" or azure noise process wherein the power spectral density increases with the frequency of the signal) and/or other biased noise distributions may be utilized. The sequence may be configured as a zero-mean process in some implementations. In one or more implementations, magnitude of values within the transmitted sequence may be determined using a continuously valued random process (e.g. a Gaussian distribution).

The waves transmitted by the component 202 may be reflected by one or more elements within the environment, e.g., floor 212, wall 210, and/or object 208 in FIG. 2 and/or 310 in FIG. 3. In some implementations, the object 208 may comprise product display 120 of FIG. 1. Reflected waves (as shown by curves 308 in FIG. 3) may be detected by the receiver 204 to produce received pattern. The received pattern (e.g., as illustrated by waveform 314 in FIG. 3) may be sampled at the sampling rate of the sequence provided for the transmission. The received sampled pattern may be accumulated for a given time interval (e.g., selected between 1 ms and several hours, in some implementations, depending on inter alia, signal to noise, reaction time and/or tolerance of false positives of the application).

The received accumulated signal may be convolved with a time-reversed copy of the transmitted sequence (e.g., as illustrated by waveform 312 in FIG. 3) to produce a correlogram. The correlogram may be analyzed in order to determine presence of objects (e.g., the wall 210, the object 208 in FIG. 2 and/or 310 in FIG. 3) in the sampling volume. In some implementations, the analysis of the correlogram may comprise detecting one or more correlation peaks above a given threshold (significant peaks), e.g., such as described below with respect to FIGS. 3-4). The peak detection threshold may be selected from the range between 2 and 5 standard deviations (sigma σ) above zero. The standard deviation may be determined using the correlogram. Peaks in the correlogram which are significantly different from zero (e.g., greater than 5×σ) may correspond to reflections of the transmitted signal from one or more objects. Occurrence of one or more peaks may indicate presence of objects. Location (e.g., time delay Δt) of individual significant peaks may be used to determine distance r to the detected object (which is echoing back the noise signal), as follows:

$$r = 0.5 C \Delta t, \quad \text{(Eqn. 1)}$$

where r denotes range to object; C is speed of signal transmission in medium, Δt is the time delay.

In some implementations, the correlogram may be obtained using a filtered version of the received signal. In some implementations, the filter may comprise band-pass or a high pass filter configured to remove, e.g. low frequency signal component. For example, 50/60 Hz line noise that may pollute recorded signals may be filtered out using a high pass filter with a corner frequency selected from the range between 100 Hz and 1000 Hz.

In some implementations, the correlogram may be filtered prior to peak detection process. The filter may comprise a band-pass or the low-pass filter.

Use of some signal modalities such as audio or radio may prove it difficult to completely isolate the receiver from the transmitter and thus the receiver may pick up the direct transmission of the pattern. In some implementations, signal component due a direct path from the transmitter to the receiver may be removed from the computed correlogram. The direct path signal may be removed by blanking out the correlogram for a time period corresponding to the direct path, subtracting a template of the expected direct path signal or high-pass filtering the sequence of correlograms as they are computed progressively over time.

Figure 4A:
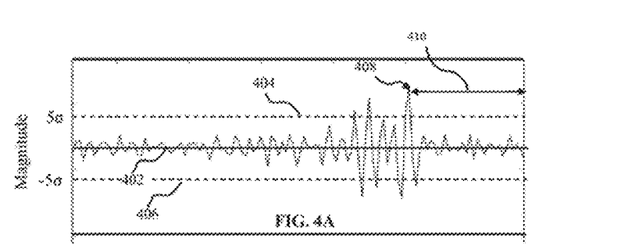
FIGS. 4A-4B illustrate correlograms obtained using the reverse correlation methodology of the disclosure in accordance with one implementation.
Figure 4B:
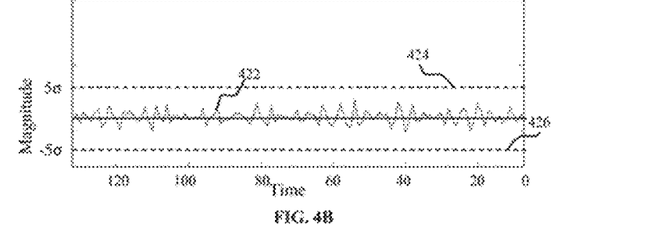

FIGS. 4A-4B present data illustrating correlograms obtained using the reverse correlation methodology of the disclosure in accordance with one implementation. Broken lines 404, 406, 424, in FIGS. 4A, 4B denote event detection thresholds used for peak (positive threshold) and trough (negative threshold) detection. Thresholds in FIGS. 4A-4B are configured at +−5σ from the mean value. In some implementations, the correlogram may be configured in accordance with a zero mean process.

X axis in FIGS. 4A-4B denotes time (in samples) from the onset of transmission (at 0 samples). Data presented in FIGS. 4A-4B were obtained using audio transmission/reception. Transmitted and received waveforms (such as shown by curves 312, 314 in FIG. 3) were obtained by sampling at 44100 samples per second. Accordingly, inter sample interval for data shown in FIG. 4A may correspond to 0.023 millisecond.

Curve 422 in FIG. 4B depicts correlogram data obtained in absence of objects in the sampling volume of the sensor. Curve 402 in FIG. 4 depicts correlogram data obtained in presence of one or more objects. One or more reflections (e.g., peak 408) may breach the threshold (e.g., 404). Peaks breaching a respective threshold may be associated with a given object in the sampling volume of the sensor (e.g., 310 in FIG. 3). Position of the peak with respect to the transmission onset (e.g., time interval 410 in FIG. 4A) may be used to determine range to the object using, e.g., Eqn. 1. The time interval 410 may be referred to as a time delay, lag, and/or peak position. By way of an illustration, peak 408 is positioned at 39 samples after the onset of the transmission. The corresponding time interval 410 may be determined as 39/441000.88 milliseconds. Taking sound speed in air of 343 m/s, and using Eqn. 1, distance to an object corresponding to the peak 408 may be determined at 0.15 m.

In some implementations, the correlogram may comprise non-negative values determined based on an absolute value of the convolution operation. Object reflections may be determined based on locating one or more peaks using a positive threshold (e.g., 404 in FIG. 4A).

Figure 5:
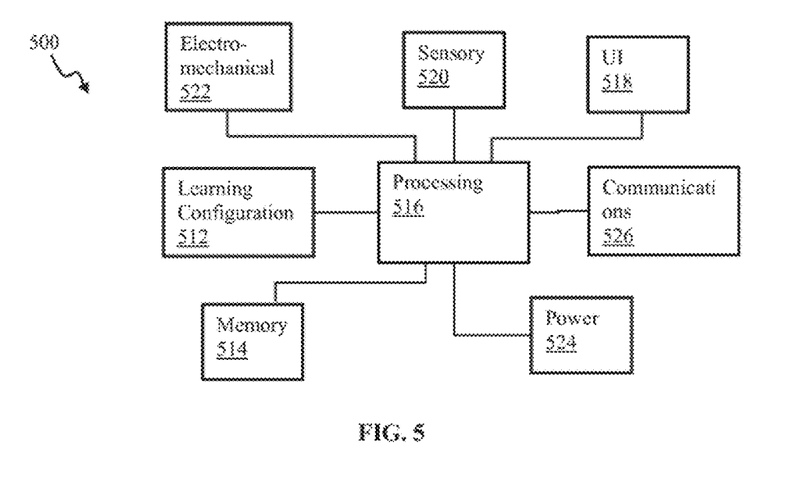
FIG. 5 is a functional block diagram illustrating a computerized system configured to implement the bistatic sensing methodology of the disclosure, an adaptive predictor and/or a combiner components configured for operating, e.g., the robotic apparatus of FIG. 2, according to one or more implementations.

FIG. 5 illustrates a computerized system configured to implement the sensing methodology of the disclosure, according to one or more implementations.

The system 500 may comprise a learning configuration (robotic brain) component 512 for controlling a robotic apparatus (e.g., 200 of FIG. 2). The learning configuration component may be logically implemented within a processor that executes a computer program embodied as instructions stored in non-transitory computer readable media, and configured for execution by the processor. In some implementations, the robotic brain may be implemented as dedicated hardware, programmable logic (e.g., field programmable gate arrays (FPGAs), and/or other logical components), application specific integrated circuits (ASICs), and/or other machine implementations. Additional memory 514 and processing components 516 may be available for other hardware/firmware/software needs of the robotic device. In some embodiments, the learning logic may comprise a separate processor (FPGA, ASIC, neuromorphic processor) or a software process operable on a CPU.

Sensor components 520 may enable the robotic device to accept stimulus from external entities. Input stimulus types may include, without limitation: video, audio, haptic, capacitive, radio, accelerometer, ultrasonic, infrared, thermal, radar, lidar, sonar, and/or other sensed inputs. In some implementations, the sensor components 520 may comprise a transmitter and a receiver components, e.g., such as described above with respect to FIG. 2 and/or FIG. 3. The sensor components 520 may be configured to produce waveforms 312, 314 described with respect to FIG. 3. The sensor components 520 may interface with the processing component 516.

The processing component 516 may operate an object detection process of the disclosure. The detection process may comprise determination of a correlogram, e.g., such as described with respect to FIG. 4A and/or FIG. 6. After the correlogram is computed, and optionally the direct signal removed, the correlogram may be thresholded for positive and negative signals that exceed a given threshold. This threshold may be selected from a range between 3 and 9 standard deviations of the correlogram. In some implementations, the standard deviation may be computed using an off-line approach and/or an on-line approach by computing the distribution of correlation values for the recorded signal convolved with any pseudo and true random sequence not recently transmitted The processing component 516 may interface with the user interface (UI) components 518, sensor components 520, electro-mechanical components 522, power components 524, and communications (comms) component 526 via one or more driver interfaces and/or software abstraction layers. In one or more implementations, the power components 524 may comprise one or more of a direct current, an alternating current source, a mechanical coupling, an energy accumulator (and/or a mechanical energy means (e.g., a flywheel, a wind-up apparatus), a wireless charger, a radioisotope thermoelectric generator, a piezo-generator, a dynamo generator, a fuel cell, an internal or external combustion engine, a pneumatic power source, a hydraulic power source, and/or other power sources.

Additional processing and memory capacity (not shown) may be used to support these processes. However, it will be appreciated that the aforementioned components (e.g., user interface components 518, sensor components 520, electro-mechanical components 522) may be fully controlled based on the operation of the learning configuration 512. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The electro-mechanical components 522 include virtually any electrical, mechanical, and/or electro-mechanical component for sensing, interaction with, and/or manipulation of the external environment. These may include, without limitation: light/radiation generating components (e.g. light emitting diodes (LEDs), infrared (IR) sources, incandescent light sources, etc.), audio components, monitors/displays, switches, heating elements, cooling elements, ultrasound transducers, lasers, camera lenses, antenna arrays, and/or other components.

The electro-mechanical components 522 may further include virtually any type of component capable of motion (e.g., to move the robotic apparatus 500, manipulate objects external to the robotic apparatus 500 and/or perform other actions) and/or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the learning configuration and enable physical interaction and manipulation of the device. In some implementations of robotic cleaning devices, the electro-mechanical components 522 may comprise one or more of a vacuum component, brush, pump, scrubbing/polishing wheel, and/or other components configured for cleaning/maintaining of premises. Such components enable a wide array of potential applications in industry, personal hobbyist, building management, medicine, military/intelligence, and other fields (as discussed below).

The communications component 526 may include one or more connections configured to interact with external computerized devices to allow for, inter alia, management and/or control of the robotic device. The connections may include any of the wireless or wireline interfaces discussed above, and further may include customized or proprietary connections for specific applications.

The power system 524 may be configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of a robotic apparatus (e.g., 200 of FIG. 2). Thus, the robot may improve its efficiency (e.g., to consider power consumption efficiency) through learned management techniques specifically tailored to the tasks performed by the robotic apparatus.

Figure 6:
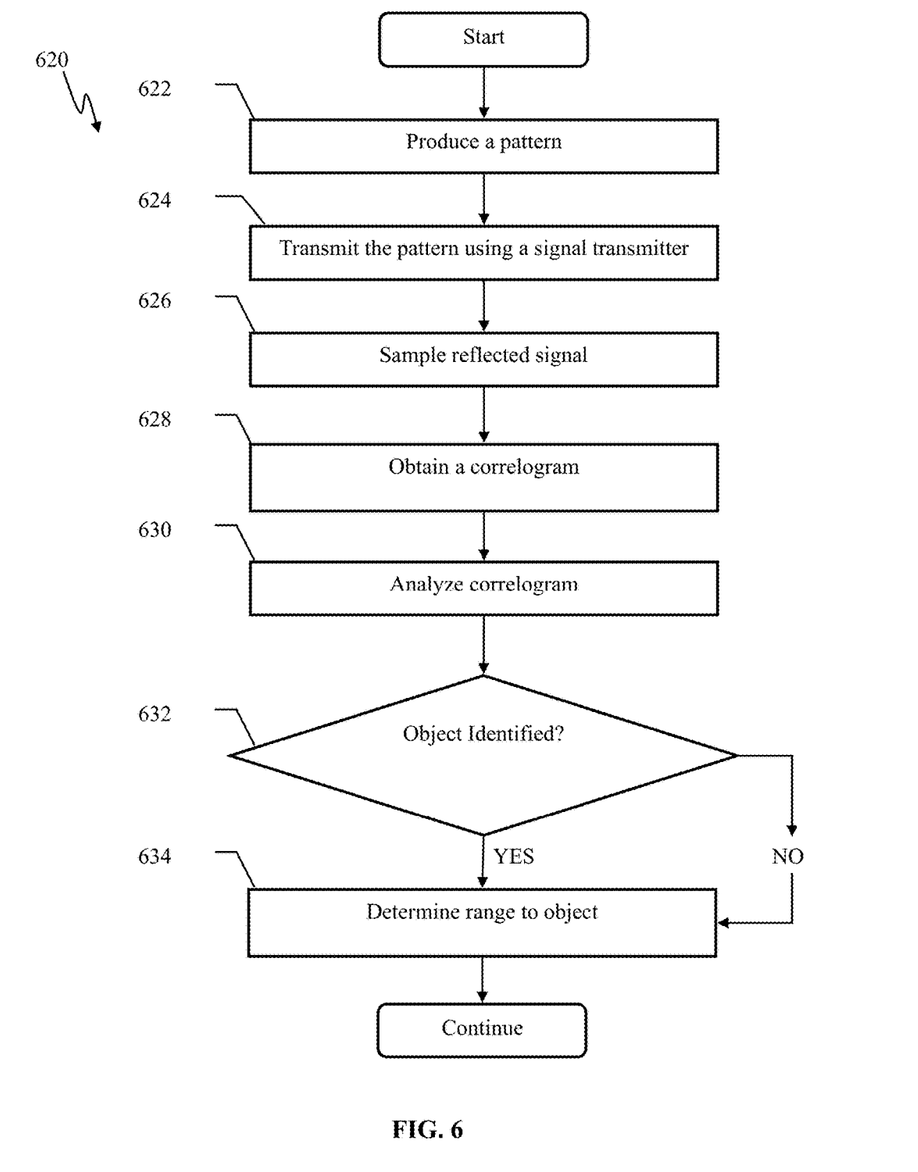
FIG. 6 is a logical flow diagram illustrating method of detection range to an object using of the approach of the disclosure, in accordance with one or more implementations.

FIG. 6 illustrates method for using the methodology of the disclosure for detection of objects during operation of robotic devices, in accordance with one or more implementations. The operations of methods 620 presented below are intended to be illustrative. In some implementations, methods 620 may be accomplished with one or more additional operations not described, and/or without one or more of the operations discussed. Additionally, the order in which the operations of method 620 are illustrated in FIG. 6 described below is not intended to be limiting.

In some implementations, methods 620 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 620 in response to instructions stored electronically on an electronic storage medium. The one or more processing devices may include one or more devices configured through hardware, firmware, and/or software to be specifically designed for execution of one or more of the operations of methods 620. The operations of methods 620 may be implemented by a bistatic sensor apparatus disposed on a robotic device (e.g., the device 200 in FIG. 2). In some implementations, the robotic device may comprise a cleaning device (e.g., 102 in FIG. 1) operating within a premises (e.g., 100 in FIG. 1)

At operation 622 of method 620, a pattern may be produced. In one or more implementations, the pattern may comprise a pseudo-random bit sequence (e.g., maximum length sequence (MLS)) determined using a maximal linear feedback shift register. In some implementations, the pattern may comprise a random bit sequence produced using, e.g., a random process. Various random processes may be utilized, e.g., uniform, Poisson and/or other process. In some implementations, the pattern may comprise a plurality of bits of a given length (e.g., 1024-bit MLS). Bit values within the sequence may comprise a binary sequence (e.g., [0, 1], [−1 1] or another sequence characterized by two alternate states. In one or more implementations, the sequence magnitude values may be produced using a Gaussian distribution.

In some implementations, the pattern may comprise a randomly distributed sequence of values (e.g., white noise). Biased (e.g., a pink) noise process with a frequency spectrum such that the power spectral density (energy or power per Hz) is inversely proportional to the frequency of the signal or another biased noise distributions may be utilized. Sequence may be configured as a zero-mean process in some implementations.

At operation 624 the pattern may be transmitted. In one or more implementations, the pattern may be used to modulate signal generated by the transmitter. In some implementations of binary patterns, portions of the pattern comprising binary zero may cause the transmitter to be turned off, portions of the pattern comprising binary one may cause the transmitter to be turned on. In one or more implementations of binary patterns, the portions of the pattern comprising binary zero may cause the transmitter to transmit the most negative value, portions of the pattern comprising binary one may cause the transmitter to generate the most positive value. Various types of waves may be utilized, pressure waves (e.g., audio, ultrasonic), light (ultraviolet (UV), infrared (IR), and/or visible) waves produced using a light emitting diode (LED), electrically pumped semiconductor laser (e.g., a laser diode), radio waves, and/or a combination thereof.

At operation 626 the reflected signal may be sampled. In some implementations of acoustic wave type, operation 626 may comprise sensing of sound reverberation using a microphone. The sensed waveform may be sampled at a sampling rate matching time-resolution of the transmitted sequence. Duration of the sampled waveform may be selected in accordance with requirements of a given application. By way of an illustration of an audio signal ranging using a 44 kHz sampling frequency, strong echoed signals may be detected within 5 ms (corresponding to 220 samples/correlation vector length) at 5 standard deviations (corresponding to 1 in 10,000 measurements false positive rate). In some implementations, sampling operation may be performed continuously. Sampled waveform may be accumulated into a buffer. Upon reaching a given duration, the sampled waveform may be provided to a correlogram determination process described below.

At operation 628 a correlogram may be obtained. In some implementations, the correlogram may be obtained by convolving a time-reversed copy of the transmitted random/pseudo-random sequence with the received sampled signal; during convolution the mean value may be subtracted from at least one of the signals (transmit or receive) to produce zero-mean signal. The number of time-lags used in the correlogram may be configured based on the sampling rate and the distance range of detection relevant for the application; for example with audio sampled at 44 kHz with a maximum range estimate of 2 meters may correspond to a time-lag range between 0 ms and 6 ms and/or a correlogram of length 265. In some implementations, the received signal may be filtered (e.g., band-passed or low-passed) in order to reduce low and/or high frequency content of the correlogram. In some implementations, the correlogram may be filtered (e.g., band-passed or low-passed) in order to reduce low and/or high frequency content of the correlogram At operation 630 the correlogram may be analyzed. In some implementations, the analysis may comprise filtering of the correlogram (e.g., band-pass or low-pass) in order to reduce low and/or high frequency content of the correlogram. The correlogram analysis may comprise determination of an object detection threshold (peak threshold, trough threshold), e.g., based on a number of standard deviations. The correlogram analysis may comprise determination of one or more peaks/troughs in the correlogram.

At operation 632, when one or more objects are identified the method proceeds to operation 434 where a range to the detected object is determined. In one embodiment, the one or more objects are identified when a peak or a trough breaches a peak/trough detection threshold. Responsive to a determination at operation 632 that the peak is above the peak detection threshold (e.g., 404 in FIG. 4A) or a trough is below the trough detection threshold (e.g., 406 in FIG. 4A) the method may proceed to operation 434 where range to object corresponding to the given peak may be determined. In some implementations, the range to object may be determined using methodology described above with respect to FIG. 4A and/or Eqn. 1.

Object detection and/or object ranging methodology described herein may advantageously enable continuous estimation of range to objects and/or obstacles form robotic devices during autonomous operation. Continuous ranging may reduce time to impact and/or enable a robotic device to execute avoidance and/or an approach maneuver.

A ranging apparatus of the disclosure may utilize multiple transmitters and/or receivers in order to enable redundancy. In some implementations when operating contemporaneously with one another, individual transmitters may utilize unique random sequences (code division multiplexing) in order to avoid ambiguity. In one or more implementations individual transmitters may operate using alternate time slots (time division multiplexing) in order to avoid signal ambiguity. Other multiple access approaches may be utilized, e.g., frequency division multiplexing, polarization multiplexing, and/or other approaches.

Multiple signal types (modalities) may be employed contemporaneous with one another in order to provide multiple range estimates. Individual range estimates obtained using different physical wave types may be characterized by different performance characteristics, e.g., maximum detection range, range resolution, detection accuracy, energy use, and/or other performance characteristics. Given ranging sensor configuration may be selected based on parameters of a given application. By way of an illustration, a radio frequency sensor may be used to detect objects at greater distances (such from 0 m to 30 m) with poorer spatial resolution (e.g., 0.06 m, 2.4 GHz sampling rate). An acoustic sensor may be used to detect objects at closer distances (such as 0 m to 2 m) with higher spatial resolution (0.004 m, 44 kHz sampling rate) compared to the RF ranging.

Use of broadband signal transmissions enables object detection and/or ranging in varying environments, in the presence of noise (e.g., daylight, IR motion sensors, acoustic sensors in the same environment). Broadband signals may provide for detection of objects that may not be readily detectable by a single frequency (narrowband) signals, e.g., due to object geometry and/or object reflective properties.

Methodology of the disclosure may enable autonomous navigation by robotic devices in a variety of applications. The object detection approach disclosed herein a robotic device to a variety of objects without object pre-selection and/or pre-of wiring and/or without requiring a trainer to record training dataset and analyze data offline. These improvements may be leveraged for constructing autonomous robotic vehicles characterized by a lower cost and/or increased autonomy and/or enable robotic devices to operate in more complex requirements (e.g., tracking multiple targets), navigate at higher speeds, and/or achieve higher performance (e.g., as characterized by a fewer collisions, shorter task execution time, increased runtime without recharging, greater spatial coverage, and/or other parameter).

Although the methodology of the disclosure is primarily described for robotic and vehicle navigation applications, the object detection and/or ranging technology may be used in a variety of applications where short range (e.g., between 1 m and 100 meters) ranging may be of use. By way of an illustration, the methodology of the disclosure may be utilized in human-robot interaction applications for example when determining how far away a hand is from the robot, in order to cause the robot to stop, move forward or backwards.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed:

1. A method for determining range to an object, comprising:
    transmitting, via a transmitter, a broadband signal, the transmitter including an electrically pumped semiconductor laser element,
    producing, via a receiver, a sampled signal based on a sample of a reflected signal, the reflected signal including a reflection of the broadband signal off the object, the receiver including a photodetector;
    determining, via execution of computer readable instructions stored on at least one processor, a time-reversed instance of the transmitted broadband signal, the at least one processor including computer readable instructions stored thereon;
    determining, via execution of computer readable instructions stored on the at least one processor, one or more correlograms, a respective one of the one or more correlograms including a convolution of the time-reversed instance of the transmitted broadband signal and the sampled signal at a plurality of lags, the respective one of the one or more correlograms corresponding to a zero-mean signal by subtraction of a mean value from at least one of the transmitted broadband signal and the sampled signal, the respective one of the one or more correlograms including one or more values;
    comparing, via execution of computer readable instructions stored on the at least one processor, the one or more correlogram values of the respective one of the one or more correlograms at the plurality of lags to a detection threshold; and
    determining, via execution of computer readable instructions stored on the at least one processor, a range to the object based on the one or more values of the respective one of the one or more correlograms breaching the detection threshold, the range corresponding to a given lag of the plurality of lags, where the given lag is associated with the one or more values of the respective one of the one or more correlograms.

2. The method of claim 1, wherein the broadband signal comprises an electromagnetic wave transmission.

3. The method of claim 2, wherein the receiver is spatially spaced from the transmitter.

4. The method of claim 2, wherein the electromagnetic wave is characterized by a frequency selected within a radio frequency band.

5. The method of claim 2, wherein the electromagnetic wave transmission is characterized by a frequency selected within a visible light frequency band.

6. The method of claim 1, wherein the plurality of lags exceeds 100 lags.

7. The method of claim 1, wherein
    the detection threshold determination comprises determination of the mean value and a standard deviation value of the respective one of the one or more correlograms; and
    the detection threshold comprises a positive component configured to be greater than the mean value and a negative component configured to be smaller than a negative mean value having an absolute magnitude equal to the mean value.

8. The method of claim 7, wherein,
    the positive component is configured to be based on a first number of standard deviation values above the mean value; and
    the negative component is configured to be based on a second number of standard deviation values below the negative mean value.

9. The method of claim 1, further comprising:
    filtering, via execution of computer readable instructions stored on the at least one processor, the correlogram prior to the comparison of the one or more correlogram values to the detection threshold.

10. The method of claim 1, wherein the given time lag corresponds to a position of a local peak or a local trough of the correlogram relative to an onset of the transmission of the broadband signal.

11. The method of claim 10, further comprising:
    detecting, via execution of computer readable instructions stored on at least one processor, a presence of the object when the local peak or the local trough of the correlogram breaches the one or more detection thresholds.

12. A method for determining at least one positional attribute associated with an object, comprising:
    transmitting, via a transmitter, configured to transmit an oscillatory signal, the transmitter including an electrically pumped semiconductor laser element;
    producing, via a receiver, a sampled signal based on a sample of a reflected signal, the reflected signal including a reflection of the oscillatory signal off the object, the receiver including a photodetector;
    performing, via execution of computer readable instructions stored on at least one processor, a comparison of at least a modified signal, the modified signal comprising the portion of the modified instance of the at least the portion of the transmitted oscillatory signal to at least a portion of the sampled signal, the at least one processor including computer readable instructions stored thereon;
    evaluating, via execution of computer readable instructions stored on the at least one processor, one or more values obtained from the comparison to a detection criterion, the detection criterion comprising a positive threshold or a negative threshold of a magnitude of the at least the modified signal; and determining, via execution of computer readable instructions stored on the at least one processor, at least one positional attribute associated with the object corresponding to a parameter associated with the at least one of the one or more values obtained from the comparison, the determining based on at least one of the one or more values from the comparison breaching the positive threshold or the negative threshold from a baseline.

13. The method of claim 12, wherein, the at least one positional attribute comprises a range;

the oscillatory signal comprises either a broadband acoustic or broadband electromagnetic signal;

the modified instance comprises a time-reversed instance of at least a portion of the transmitted oscillatory instance;

the comparison comprises an autocorrelation performed at least at a plurality of time lags of each of the at least portion of modified instance and the at least portion of the sampled signal;

the one or more values comprise respective one or more amplitudes; and the evaluation of said one or more values obtained from the comparison to a detection criterion comprises comparison to a predetermined detection threshold value stored in the apparatus.

14. The method of claim 12, wherein the oscillatory signal further comprises a pseudorandom sequence that includes a plurality of bits of a given length selected using a random process.

15. A non-transitory computer-readable storage apparatus comprising a storage medium having a computer program, the computer program comprising a plurality of instructions configured to, when executed by a processor apparatus:

cause a transmitter to transmit a broadband signal, the transmitter including an electrically pumped semiconductor laser element;

cause a receiver to produce a sampled signal based on a sampling of a reflection of the broadband signal from an object, the receiver including a photodetector;

cause the processor apparatus to: determine a time-reversed instance of the transmitted broadband signal; determine a correlogram, the correlogram comprising a convolution of the time-reversed instance of the transmitted broadband signal and the sampled signal at a plurality of time lags;

compare (i) one or more correlogram values of the correlogram at the plurality of time lags to (ii) one or more detection thresholds; and determine a range to the object based on at least a portion of the one or more correlogram values breaching the one or more detection thresholds, the range corresponding to a given time lag of the plurality of time lags, where the given time lag is associated with the at least portion of the one or more correlogram values.

16. The non-transitory computer-readable storage apparatus of claim 15, wherein the broadband signal comprises an electromagnetic wave transmission.

17. The non-transitory computer-readable storage apparatus of claim 16, wherein the electromagnetic wave is characterized by a frequency selected within a radio frequency band.

18. The non-transitory computer-readable storage apparatus of claim 15, wherein the plurality of instructions are further configured to, when executed by the processor apparatus, cause the processor apparatus to determine a quantity of the plurality of time lags based on a sampling rate and a distance of detection.

19. The non-transitory computer-readable storage apparatus of claim 15, wherein the plurality of instructions are further configured to, when executed by the processor apparatus, cause the processor apparatus to filter the correlogram prior to the comparison of the one or more correlogram values to the one or more detection thresholds.

20. The non-transitory computer-readable storage apparatus of claim 15, wherein the plurality of instructions are further configured to, when executed by the processor apparatus, cause the processor apparatus to detect a presence of the object when a local peak or a local trough of the correlogram breaches the one or more detection thresholds.

21. The non-transitory computer-readable storage apparatus of claim 20, wherein the determination of the range to the object corresponding to the given time lag comprises a determination of a position of the local peak or the local trough of the correlogram relative to an onset of the transmission of the broadband signal.

* * * * *